United States Patent Office 3,535,572
Patented Oct. 20, 1970

3,535,572
ALTERNATOR HAVING ROTATABLE MAGNETIC
FIELD AND ARMATURE STRUCTURES
John De Rugeris, 695 Kenneth Ave.,
Campbell, Calif. 95008
Filed Nov. 15, 1968, Ser. No. 776,160
Int. Cl. F16c 1/24
U.S. Cl. 310—168       6 Claims

ABSTRACT OF THE DISCLOSURE

An alternator including relatively rotatable magnetic field and armature structures wherein the opposite poles of the magnetic field structure are spaced from each other along the axis of rotation, and each pole forms a sequence of angularly equi-spaced pole pieces of the same polarity, with the pole pieces of the opposite poles angularly displaced relative to each other along the orbit of relative rotation of said field and armature structures. The armature structure comprises usually several generating circuits, each composed of a plurality of series-connected coils, and each coil includes two oppositely wound series-connected twin coil portions which are spaced from each other along the axis of rotation and are located for exclusive cooperation with pole pieces of the same polarity; and the coil portions of different circuits are arranged alternately adjacent to each other along the orbit of the relative rotation of the defined field and armature structures.

---

The present invention relates to machines for generating electric power. More particularly, the present invention relates to machines for generating alternating electric current, which are commonly known as "alternators."

It is an object of the present invention to furnish an alternator that provides a highly favorable ratio of the energy employed for its operation and the electric power provided thereby.

Figure 1:
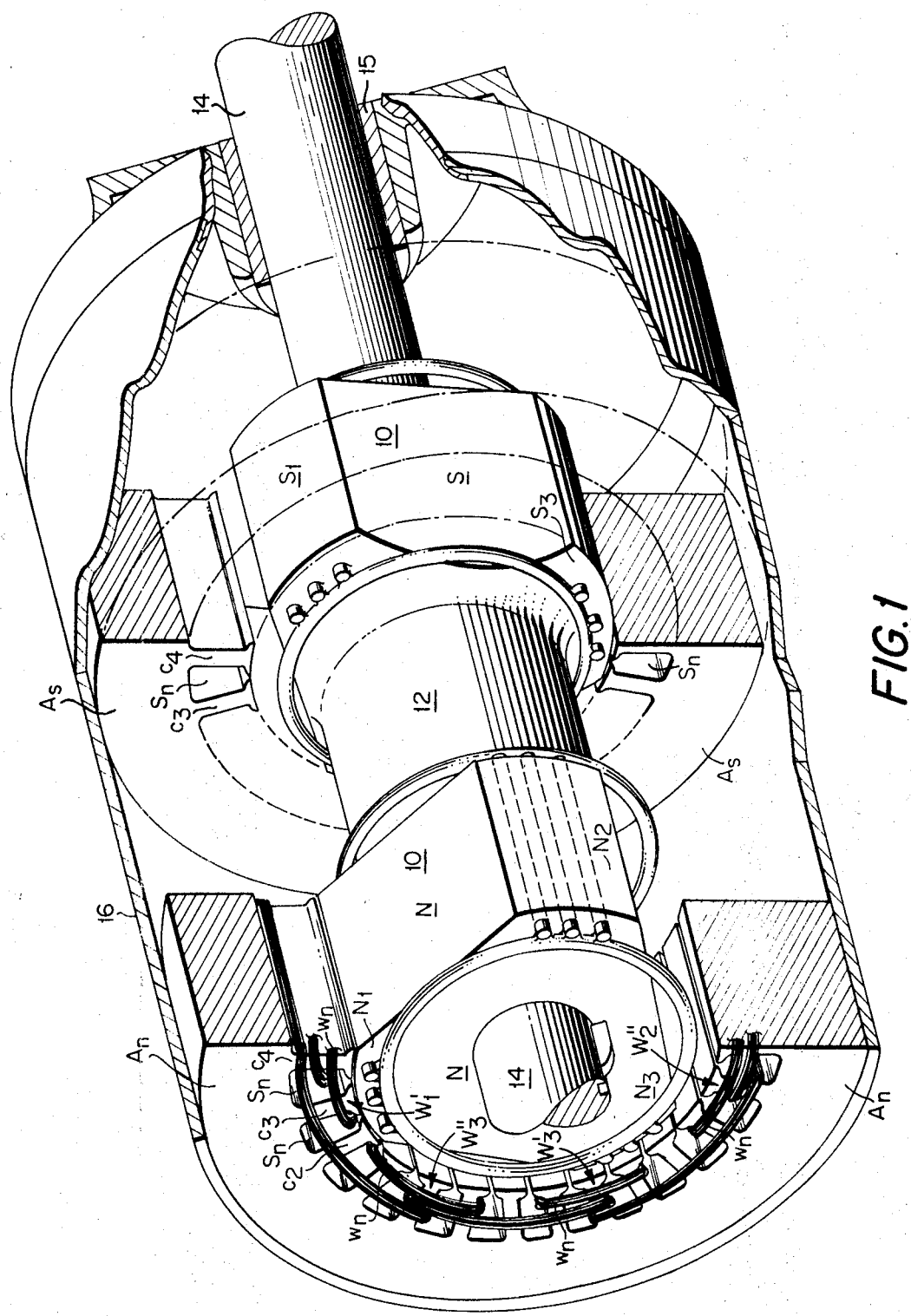
Figure 3A:
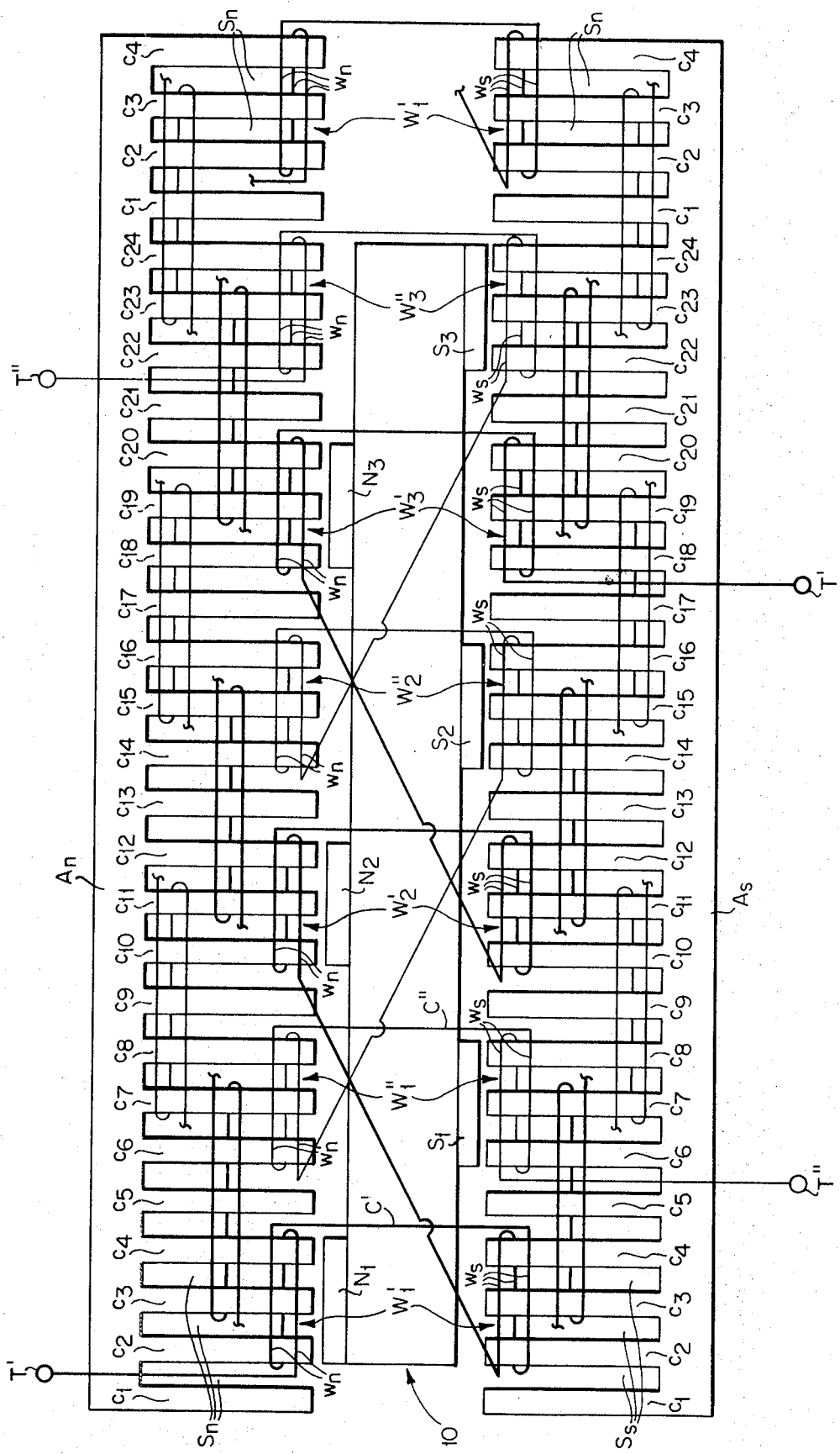
Figure 3B:
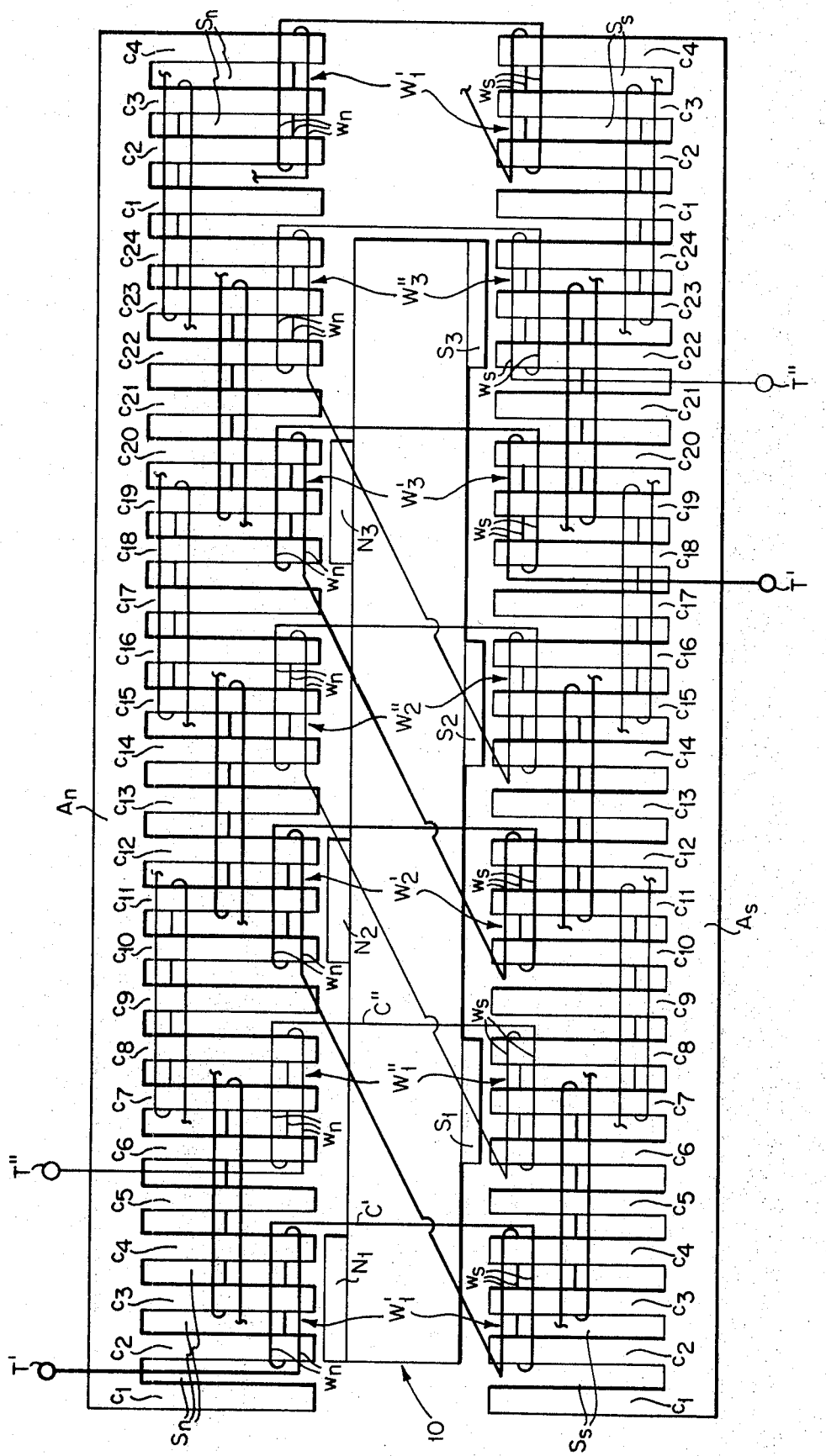
Figure 2:
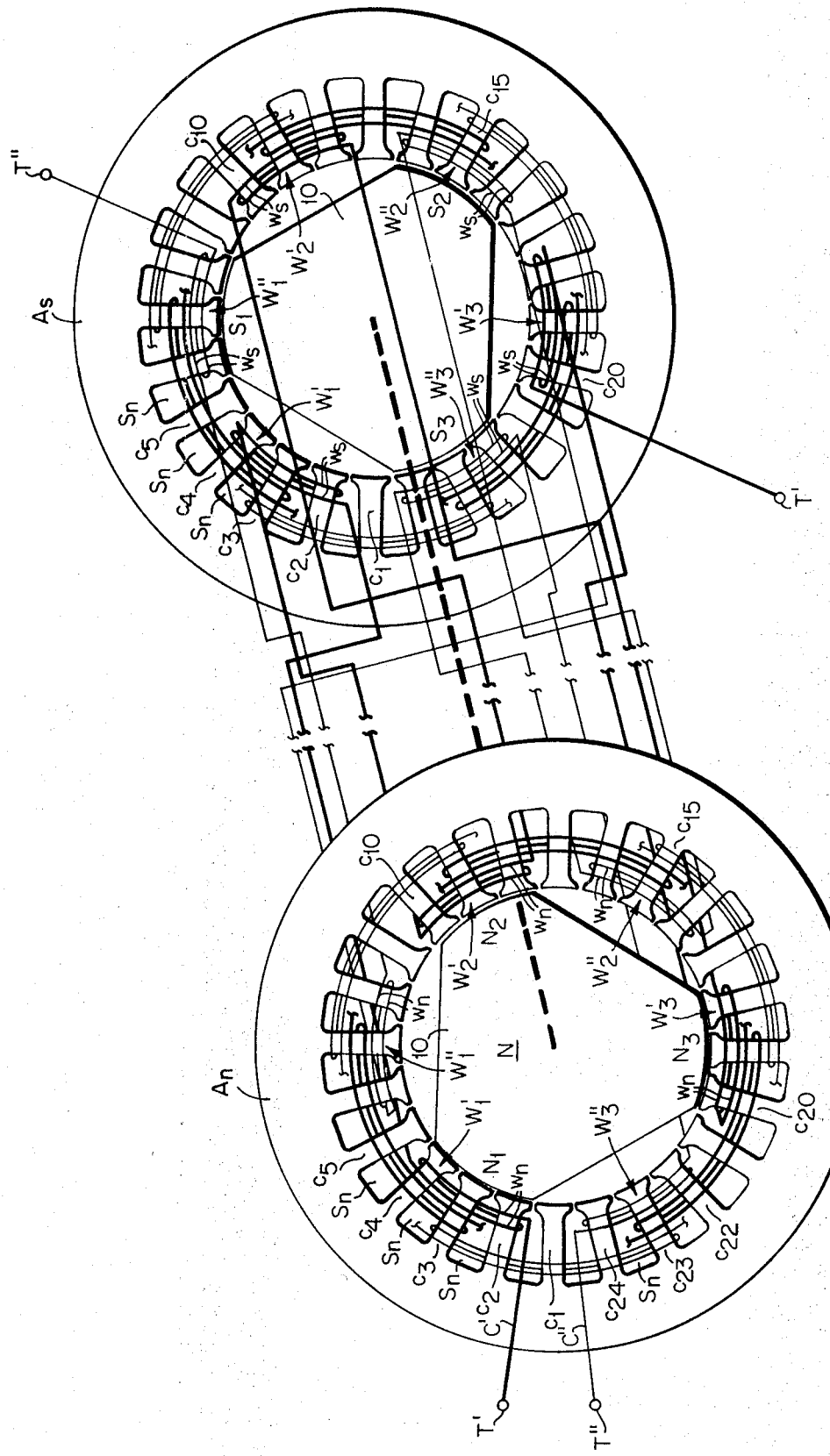

This and other objects of the present invention will be apparent from the following description of the accompanying drawings which illustrate a preferred embodiment thereof and wherein FIG. 1 is a fragmentary perspective of an alternator having a stationary armature and a rotating field, constructed in accordance with my invention;

FIG. 2 is a fragmentary, exploded, diagrammatic perspective of the armature of the alternator shown in FIG. 1; and FIGS. 3A and 3B are developments of modified embodiments of the armature of the alternator.

In most electricity generating devices electric currents are produced in coils of electrically conductive material, such as copper, by the relative rotation of a set of such coils known as the "armature' and a "magnetic field" produced by an electromagnet or a permanent magnet, such that the magnetic force lines of the latter intersect continually, or are continually intersected by the turns of the armature coils; and to increase the electricity-generating effect of the magnetic field upon the turns of the armature coils, said coils are usually provided with cores of iron or other material of lesser magnetic reluctance than air, to concentrate the magnetic field established by the magnet, into the immediate vicinity of the coils and thus cause a greater number of force lines to be intersected by the turns of the armature coils during relative rotation of armature and field.

In accordance with my invention, the armature of an electric alternator comprises sets of series-connected coils or windings which form different generating circuits, and each of said coils or windings includes two twin portions which are spaced from each other in the direction of the axis of rotation of whatever part of the alternator is the rotor. These two twin coil or winding portions are wound in opposite directions about oppositely located core structures. Associated with the armature windings in a field producing magnet structure constructed to form sequences of angularly equi-spaced pole pieces of the same denomination, which are spaced from each other in the direction of the axis of rotation, i.e., the pole pieces at one end of the magnetic structure are all North poles and the pole pieces on the other end of said structure are all South poles. Said North and South pole pieces are angularly displaced relative to each other such that angularly each North pole piece is positioned intermediately of two oppositely located, consecutive South pole pieces, and vice versa each South pole piece is positioned intermediately of two oppositely located consecutive North pole pieces. The described magnet structure is physically related to the described armature winding arrangement in such a manner that whenever a North pole piece passes one of the winding portions of one set of windings, the directly succeeding South pole piece on the opposite end of the magnet structure passes the oppositely located winding portion of the directly succeeding armature winding, i.e., a winding portion belonging to a different set of series-connected windings. In this manner the sets of series-connected coils or windings provide alternating voltages which may or may not be in phase with each other, depending upon the particular type of alternator concerned.

The exemplary embodiment of the invention illustrated in the accompanying drawings is of the type having a stationary armature and a rotating field. For reasons of simplicity said field is shown as formed by a permanent magnet 10 having a tubular cylindrical center portion 12 to whose opposite ends are attached pole pieces N and S of the cross-sectional contour of a triangle. The corners of said triangle have been truncated and smoothly rounded off to define a cylindrical surface of a larger radius than the cylindrical body portion 12 of the magnet so that said truncated corners project radially beyond the cylindrical surface of said body portion. Thus, a sequence of three angularly equi-spaced individual pole pieces of equal denomination $N_1$, $N_2$, $N_3$, and $S_1$, $S_2$, $S_3$, respectively, are formed at the opposite ends of the magnet (FIGS. 1 and 2). For rotation the magnet is mounted upon a horizontally disposed, splined shaft 14 (FIG. 1) that passes through the hollow interior of the body portion 12 of the magnet and registering openings in the pole pieces N and S, and whose projecting ends are suitably journaled in the frame of the alternator as indicated at 15. From FIGS. 1 and 2, it should be noted that the poles at the opposite ends of the magnet are angularly displaced relative to each other, such that when viewed in a direction axially of the magnet, each of the North pole pieces $N_1$, $N_2$, $N_3$, is located intermediately of two consecutive South pole pieces at the opposite ends of the magnet, and vice versa each South pole piece $S_1$, $S_2$, $S_3$, is located intermediately of two consecutive North pole pieces at the other end of the magnet.

Arranged around the pole pieces at the opposite ends of the magnet are annular armature core structures $A_n$ and $A_s$ of a suitable magnetizable material, such as laminated steel stampings, whose inner edges are provided with an endless sequence of radially extending slots $S_n$ and $S_s$, respectively, for the reception of the armature coils. Said armature core structures are stationary and are suitably mounted upon the base of the generator frame 16. In the exemplary embodiment of the invention which I am about to describe, each of the armature core structures $A_n$ and $A_s$ has 24 such slots which define between them 24 partitions $c_1$ to $c_{24}$, to be referred to as armature cores hereinafter. As is apparent from FIGS. 1, 2, and 3, the slots $S_n$ and $S_s$, and hence the cores $c$ in the opposite armature structures $A_n$ and $A_s$ are angularly aligned with each other.

The armature of the generator of my invention comprises usually at least two, and may comprise more separate, simultaneously generating circuits, and each generating circuit comprises a plurality of pairs of series-connected coil or winding portions, with the individual twins of each pair wound in opposed relation and spaced from each other in the direction of the axis of the relative rotation of the alternator. Hence, the individual twins of each pair are limited to cooperation with pole pieces of one and the same denomination, and the two twins of each pair are never acted upon by pole pieces of the same denomination; in other words, one of the twins will continually be acted upon by pole pieces of one and the same denomination and the other twin will continually be acted upon by pole pieces of the opposite denomination. The coil portions of the different generating circuits are preferably arranged alternately adjacent to each other along the orbit of the relative rotation of the defined field and armature structure. Therefore, when the coil portions of one generating circuit are subjected to the effect of one of the pole pieces at one end of the magnetic structure, the oppositely located portions of the adjacently positioned coil portions of another generating circuit are subjected to the effect of pole pieces of opposite denomination at the opposite end of the magnetic structure. Thus, though the two twins of a coil or winding in a generating circuit are at no time simultaneously acted upon by opposite pole pieces of the magnetic structure, they are never idle for as a pole piece is withdrawn from one of the winding portions and approaches an adjacent winding portion that forms part of another generating circuit, a pole piece of opposite polarity moves within effective range of the oppositely wound twin of said first winding portion. Thus, relative rotation of the described field and armature structures produces in rapid succession current pulses in each of the generating circuits.

Having again reference to the drawings, the exemplary alternator illustrated therein has two separate, simultaneously generating circuits C' and C'', each comprising three series-connected windings $W'_1$, $W'_2$, $W'_3$ and $W''_1$, $W''_2$, $W''_3$, respectively (FIGS. 3A and 3B). Each of said coils or windings is divided into two equal halves $w_n$ and $w_s$ wound upon axially aligned groups of three of the cores $c$ of the annular armature structures $A_n$ and $A_s$ arranged around the opposite ends of the magnet 10. The twin portions $w_n$ and $w_s$ of the windings $W'_1$, $W'_2$, and $W'_3$ of circuit C' and the twin portions $w_n$ and $w_s$ of the windings $W''_1$, $W''_2$, and $W''_3$ of circuit C'' are wound upon alternate ones of said groups of three armature cores, with one core left unoccupied between each two adjacent ones of said groups. In the diagrammatic showing of FIGS. 2, 3A and 3B, the two different generating circuits C' and C'' are drawn in lines of different thickness to make it easier to distinguish between the two circuits, and the winding portions $w_n$ and $w_s$ are shown as single turn windings or coils for reasons of clarity and simplicity. Moreover, in FIGS. 3A and 3B, the pole pieces $N_1$, $N_2$, $N_3$ and $S_1$, $S_2$, $S_3$ of magnet 10 are represented by bars of sufficient angular width to span three consecutive armature cores $c$.

In FIG. 3A the letters T' identify the terminals of circuit C' and the letters T'' identify the terminals of circuit C''. Circuit C' comprises in series-connection portion $w_n$ of winding $W'_1$ wound about cores $c_2$, $c_3$, and $c_4$ of armature portion $A_n$; portion $w_s$ of winding $W'_1$ wound in an opposite sense about the aligned cores $c_2$, $c_3$, and $c_4$ of the opposite armature structure $A_s$; portion $w_n$ of winding $W'_2$ wound about cores $c_{10}$, $c_{11}$ and $c_{12}$ of armature structure $A_n$ in the same manner as the portion $w_n$ of winding $W'_1$; the oppositely wound portion $w_s$ of winding $W'_2$ about cores $c_{10}$, $c_{11}$, and $c_{12}$ of armature structure $A_s$; portion $w_n$ of winding $W'_3$ wound about cores $c_{18}$, $c_{19}$, and $c_{20}$ of armature structure $A_n$; and finally portion $w_s$ of winding $W'_3$ wound about the aligned cores $c_{18}$, $c_{19}$, and $c_{20}$ of armature structure $A_s$. Circuit C'' comprises portion $w_s$ of the winding $W''_1$ wound about cores $c_6$, $c_7$, and $c_8$ of armature structure $A_s$ in the same sense as the portion $w_n$ of winding $W'_1$ is wound about cores $c_2$, $c_3$, and $c_4$ of armature structure $A_n$; portion $w_n$ of winding $W''_1$ wound in opposite direction about the cores $c_6$, $c_7$, and $c_8$ of armature structure $A_n$; portion $w_s$ of winding $W''_2$ wound about cores $c_{14}$, $c_{15}$, and $c_{16}$ in the same sense as portions $w_n$ of winding $W'_1$, the oppositely wound portion $w_n$ of winding $W''_2$ arranged around the core pieces $c_{14}$, $c_{15}$, and $c_{16}$ of armature structure $A_n$; portion $w_s$ of winding $W''_3$ wound about cores $c_{22}$, $c_{23}$, and $c_{24}$ of armature structure $A_s$, and the oppositely wound portion $w_n$ of winding $W''_3$ about cores $c_{22}$, $c_{23}$, and $c_{24}$ of armature structure $A_n$.

In operation when the magnet structure 10 is rotated, and its North pole pieces $N_1$, $N_2$, and $N_3$ approach and pass the portions $w_n$ of windings $W'_1$, $W'_2$, and $W'_3$ generating electric power in said winding portions and hence in circuit C', its South pole pieces $S_1$, $S_2$, and $S_3$ approach and pass the portions $w_s$ of winding $W''_1$, $W''_2$, and $W''_3$ of circuit C'' producing an alternating electric current in circuit C'' which is out of phase with the current generated in circuit $C_1$, by 180°; and the same is true when the North pole pieces $N_1$, $N_2$, and $N_3$ of the magnet structure 10 approach and pass the portions $w_n$ of windings $W''_1$, $W''_2$, and $W''_3$ on armature structure $A_n$ and its South pole pieces $S_1$, $S_2$, and $S_3$ approach and pass the portions $w_s$ of windings $W'_1$, $W'_2$, and $W'_3$ on armature structure $A_s$. In both instances alternating currents are produced in both circuits C' and C''. By appropriate connection of the terminals T' and T'' of the two circuits, a single alternating current of increased voltage amplitude may be derived from the alternator of my invention with its frequency determined by the number of windings W, comprised in the generator and the speed of rotation of magnet 10.

The embodiment of the invention illustrated in FIG. 3B differs from the embodiment illustrated in FIG. 3A in that the adjacently located coil portions $w_n$ or $w_s$, respectively, of the two generating circuits are always wound in the same direction, whereas they are wound in opposite directions in the embodiment illustrated in FIG. 3A. In both instances, however, the oppositely located portions $w_n$ and $w_s$ of the same coils or windings $W'_1$, $W'_2$, $W_3$, $W''_1$, $W''_2$, and $W''_3$ are wound in opposite direction. As result of the described difference, the currents generated in both the circuits C' and C'' of the second embodiment are always fully in phase.

While I have explained my invention with the aid of a particular embodiment thereof, it will be understood that the invention is not limited to the specific constructional details shown and described by way of example, which may be departed from without departing from the scope and spirit of the invention. Thus, an alternator embodying my invention may include more than two generating circuits and, the generating circuits may include more or less than three pairs of twin winding portions. Also, while I have, for reasons of simplicity, explained my invention as employed to provide a single phase alternator wherein two individual generating circuits operate in phase or 180° out of phase, it will be understood by those skilled in the art, that the principles of my invention may be employed to construct multiphase alternators employing a plurality of twin generating circuits of the type described that may or may not be in phase.

I claim:

1. An alternator comprising relatively rotatable magnetic field and armature structures, said field structure having opposite poles spaced from each other along the axis of rotation each forming a sequence of angularly spaced pole pieces of the same polarity with said opposite pole pieces angularly displaced relative to each other along the orbit of relative rotation of said field and armature structures and said armature structure including a generating circuit having a number of series-connected coils, each of said coils including two oppositely wound, series-connected coil portions spaced from each other along the axis of rotation and located for exclusive co-operation with pole pieces of opposite polarity.

2. Alternator according to claim 1 wherein said coil portions are wound upon armature cores of magnetizable material.

3. Alternator according to claim 1 wherein said coil portions are equal twins.

4. Alternator according to claim 1 including a plurality of generating circuits, with said coil portions of said different generating circuits arranged alternately adjacent to each other along the orbit of relative rotation of said field and armature structures.

5. Alternator according to claim 4 wherein the adjacently located coil portions of different generating circuits are wound in the same direction.

6. Alternator according to claim 4 wherein the adjacently located coil portions of different generating circuits are wound in opposite directions.

References Cited

UNITED STATES PATENTS 2,769,106  10/1956  Dembowski _____ 310—168

FOREIGN PATENTS 938,234  10/1963  Great Britain.
647,241  6/1937  Germany.
545,839  7/1956  Italy.

MILTON O. HIRSHFIELD, Primary Examiner

ROBERT SKUDY, Assistant Examiner

U.S. Cl. X.R.

310—114, 185, 207